W. H. McCORMICK.
Weighing Scales.
No. 108,807. Patented Nov. 1, 1870.
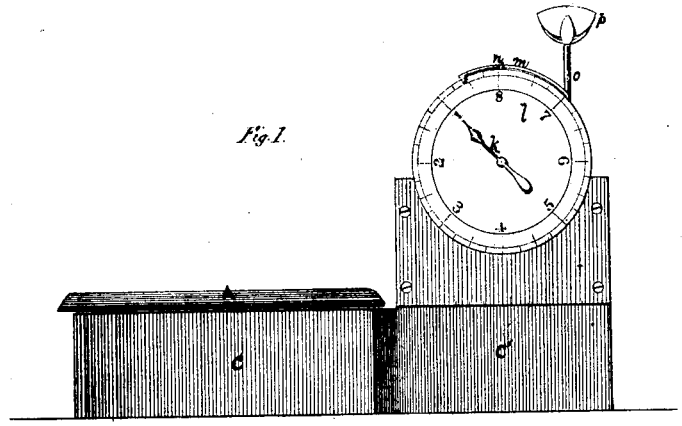
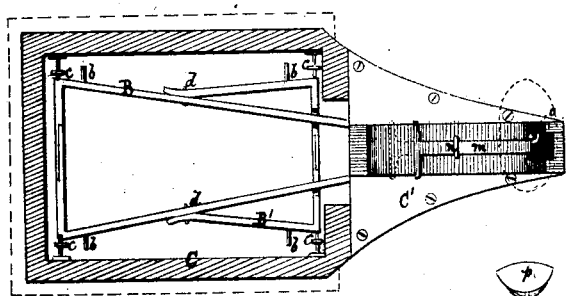
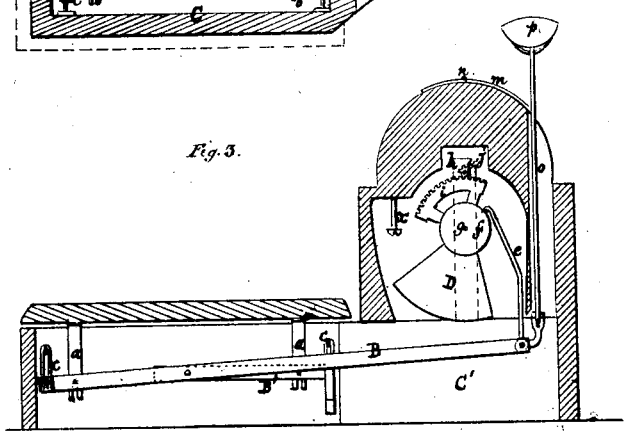
Witnesses:
Inventor:
Wm. H. McCormick
by Geo. W. Rothwell
Atty

United States Patent Office.

WILLIAM H. McCORMICK, OF MUNCIE, INDIANA, ASSIGNOR TO HIMSELF AND JOHN T. WILLIAMS, OF SAME PLACE.

Letters Patent No. 108,807, dated November 1, 1870.

IMPROVEMENT IN WEIGHING-SCALES.

The Schedule referred to in these Letters Patent and making part of the same.

*To all whom it may concern:*

Be it known that I, WILLIAM H. McCORMICK, of Muncie, in the county of Delaware and State of Indiana, have invented a new and useful Improvement in Counter-Scales; and do hereby declare that the following description forms a full and exact specification of my invention, reference being had to the accompanying drawing which forms a part thereof, and to the letters of reference marked thereon.

Figure 1 is a side elevation;

Figure 2, a top view, with the platform removed; and

Figure 3, a longitudinal central section.

The subject of this invention is an improved platform counter-scales, the platform resting upon a frame-work similar to the Fairbanks method, but differing therefrom in the devices for indicating the weight applied.

The invention consists in the devices for indicating the weight; in the employment of a sliding gauge on top of the dial; in the combination and arrangement with the platform, levers, and indicating mechanism, of a rod bearing a receptacle for weighing ounces and the fractional parts thereof; and in the general construction and arrangement of parts, as hereinafter described.

I will now proceed to give a detail description of my invention, referring to the accompanying drawing, in which similar letters of reference indicate like parts in the several figures.

In the drawing—

A represents a platform, provided on its under side with pendants $a\ a$, which rest upon studs $b\ b\ b\ b$, projecting from the sides of a frame-work, suspended by means of links $c\ c$ within a box or casing, C.

This frame-work upon which the platform rests is composed of two parts or levers B B', the form of which is clearly shown in figs. 2 and 3. These levers or parts are pivoted together at $d\ d$.

The lever B is extended forward within the part C' of the box or casing, and is connected, by means of a link, $e$, or a cord or chain, with the part $f$ of a weight, D, which swings on an axis, $g$, journaled in standards $h$, attached to the casing.

The weight D is provided with a toothed segment, $i$, which engages with a pinion, $j$, on the shaft carrying the indicators, and which has its bearings in the standards $h$.

The indicators or pointers $k\ k$ are applied to each end of the pinion-shaft, and move over the faces of dials $l\ l$, graduated to represent pounds and the fractional parts thereof, as desired.

$x$ represents a stop, to limit the movement of the weight D.

On top the casing, between the dials, a gauge, $m$, is fitted to slide in a staple or other suitable retainer, $n$. This gauge is T-shaped, as clearly shown in fig. 2, and its ends are bent down over the upper edges of the dials, as seen in fig. 1. The gauge is used when weighing an empty vessel preparatory to filling the same. The empty vessel being placed upon the platform its weight is indicated on the dials, and the gauge is moved so that its overlapping ends shall cover the mark or graduation indicated by the pointers. Then, when the vessel has been filled, the weight of the contents is reckoned from the point indicated by the gauge.

In the extreme end of the part B of the platform frame-work is fixed a vertical rod, $o$, which passes up through an opening in the casing of the scales, and carries at its top a receptacle, $p$, which is used for weighing ounces and the fractional parts thereof. To explain: On account of the increased leverage which the receptacle $p$ has over the platform, an ounce placed in the former will cause the same movement of the pointers $k\ k$ as a pound will when resting on the platform. By this provision the scales are accommodated for use by druggists and silversmiths, who frequently and generally have to weigh in quantities of less than pounds and ounces.

These scales can be made to weigh to any multiple desired, by the application of an index-hand to denote the number of revolutions made.

The simplicity of my scales, and their entire freedom from springs, which are always unreliable, combine to made the invention highly useful to the public generally.

Having thus described my invention,

What I claim, and desire to secure by Letters Patent, is—

1. The combination of one or more graduated dials, $l$, and pointers $k$, and the segment, pinion, and shaft, by means of which they are operated, with the levers B B', connection $e$, platform A, rod $o$, and receptacle $p$, all constructed, arranged, and operating substantially as herein described.

2. The construction of the gauge $m$, and its application substantially as shown and described with relation to the dial or dials, as and for the purpose set forth.

3. The arrangement of the suspended levers B B', connection $e$, weighted segment $i$, pinion $j$, and shaft, with one or more indicators, one or more graduated dials, $l$, gauge $m$, rod $o$ and receptacle $p$, and platform A, all within and upon a casing, C C', and operating substantially as described.

The above specification of my invention signed by me this 16th day of June, 1870, in the presence of two subscribing witnesses.

WM. H. McCORMICK.

Witnesses:
S. R. SUTTON,
C. W. MOORE.